Aug. 31, 1948.    I. L. LESAVOY    2,448,316
SYSTEM FOR FINISHING PLASTIC SHEETS
Filed Aug. 24, 1945
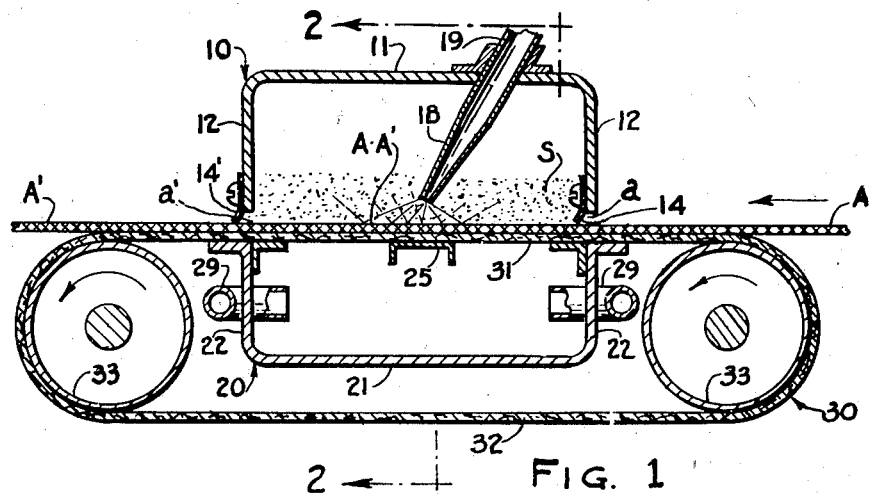
FIG. 1
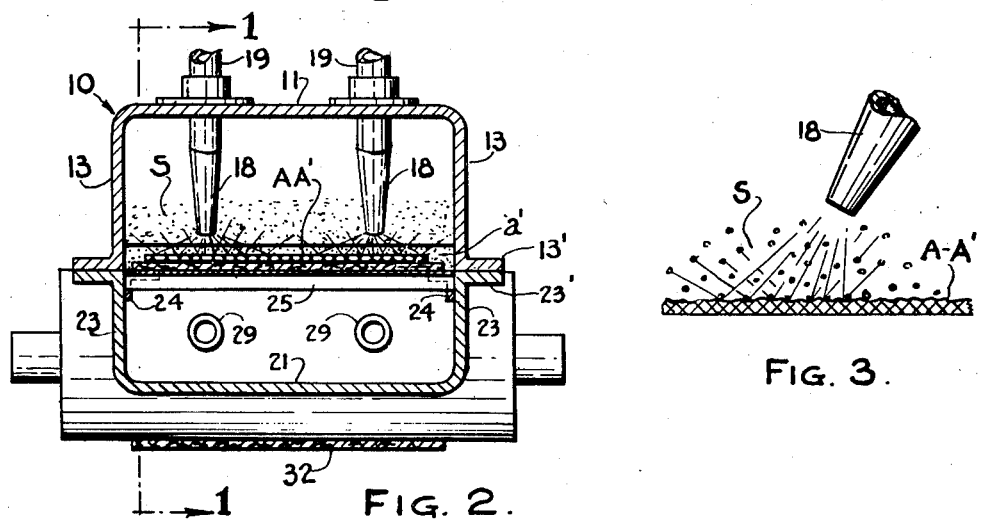
FIG. 2.
FIG. 3.
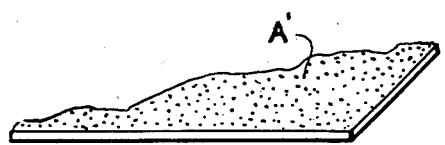
FIG. 4.
INVENTOR
I. LAWRENCE LESAVOY
BY
ATTORNEY.

Patented Aug. 31, 1948

2,448,316

UNITED STATES PATENT OFFICE 2,448,316

SYSTEM FOR FINISHING PLASTIC SHEETS

I. Lawrence Lesavoy, Allentown, Pa.

Application August 24, 1945, Serial No. 612,372

7 Claims. (Cl. 51—14)

This invention relates to a method of, and apparatus for, treating the surface of sheet material.

The object of the invention is to devise a simple method for surfacing sheets of plastic or other material while in a semi-plastic state, and to provide an inexpensive compact device for this purpose. An allied object is to provide a method and apparatus for treating sheets to give the surface thereof a desired appearance or ornamentation, in which the method may be controlled and the apparatus adjusted to vary the surface ornamentation as desired. For the attainment of these and such other objects as may appear or be pointed out herein, a preferred method is described in the following specification, and one embodiment of the apparatus is shown in the accompanying drawings.

Referring to the drawings,

Figure 1 is a side elevation, in section, through the apparatus;

Figure 2 is a sectional view thereof taken on the line 2—2 of Figure 1;

Figure 3 is a detail view to show the improved method in operation; and

Figure 4 is a perspective view of a portion of plastic sheet, showing the effects of the improved method on the surface thereof.

Referring to Figure 1, a plastic sheet A, A' is passed through the apparatus in a right to left direction, as shown by the arrow; the portion of the sheet approaching the apparatus (to the right in Figure 1) is designated A while the portion leaving the apparatus (to the left, Figure 1) is designated A'. The apparatus comprises an upper enclosure 10 which is preferably of prismatic shape having a roof 11, end walls 12, Figure 1, and side walls 13, Figure 2, being open at the bottom, and a lower enclosure 20, also preferably prismatic, having a floor 21, end walls 22, Figure 1, and side walls 23, Figure 2, and open at the top. Referring to Figure 1, the end walls 12, 12 of the upper enclosure 10 are vertically aligned with the end walls 22, 22 of the lower enclosure 20 and spaced from one another to provide an entrance clearance $a$ at the right where the plastic sheet (A) is admitted to the apparatus and an exit clearance $a'$ at the left where the treated sheet (A') leaves the matched enclosures 10, 20. Referring to Figure 2, the side walls 13, 13 of the upper enclosure 10 and the side walls 23, 23 of the lower enclosure 20 are likewise in vertical alignment, but their ends are in abutting relation and provided with means, such as flanges 13', 23', as shown in Figure 2, to make the juncture air-tight.

Plastic sheets (A, A') are carried through the enclosure 10, 20 by means of an endless belt of suitable flexible material designated generally 30, the upper loop 31 of which passes through clearances $a$, $a'$ of the enclosure 10, 20. Endless belt 30 is spanned between two pulleys 33, 33, one or both being driven in counter-clockwise direction to enable upper loop 31 to carry the plastic sheet through the apparatus from right to left. The plastic sheet thus presents the surface which is to be treated, uppermost in the upper enclosure 10. A quantity of sand S is placed in the upper enclosure 10—or rather, on belt 31 which, in effect, constitutes the bottom of upper enclosure 10—and is maintained in a constant state of agitation by compressed air fed into the upper enclosure through pipes 19, 19; two air pressure pipes 19, 19 are shown in Figure 2 merely for illustration purposes, as it is apparent that one or more than two such pipes may be employed. As best seen in Figure 1, compressed air pipe 19 is directed at an angle to the surface of the plastic sheet; it will also be seen that the angle between the pipe and the surface of the plastic sheet approaching the point of impact of the air blast—at nozzle 18—is obtuse. While air pipe 19 is shown in this manner, it will be clear that the air pipe may be directed vertically downward, or may be inclined at any desired angle, obtuse or acute; the air pipe may be inclined in the direction opposite to that shown, so as to make an obtuse or acute angle with the surface of the plastic sheet leaving the point of impact of the air blast; while both pipes 19, 19 are shown in the figures as inclined at the same angle and in the same direction, it is clear that individual pipes may be inclined at different angles and in different directions.

The sand is prevented from escaping at the entrance clearance $a$, Figure 1, by a strip 14 of suitable flexible material secured to the inside surface of the right end wall 12, and is prevented from escaping at the exit clearance $a'$ by a similar strip 14' secured to the outside of left end wall 12. The sand is prevented from escaping beyond the sides of conveyor belt 31, see Figure 2, into lower enclosure 20, by flanges or shelves 24, 24 secured to the inside of side walls 23, 23 of the lower enclosure 20, upon the horizontal, laterally extending ledges of which the marginal portions of belt 31 slide. The span of the upper loop 31 of conveyor belt 30 may be supported by one or more bridge-pieces 25, Figure 1, extending across the lower enclosure 20 in underlying relation to the belt.

The plastic sheet or sheets passing through the agitated-sand enclosure 10 is brought to, and/or maintained in a semi-plastic state by supplying steam to the lower enclosure 20, by means of pipes 29, 29.

The operation of the agitated-sand S upon the top surface of the plastic sheet A', while in a semi-plastic state, is diagrammatically shown in Figure 3. The effect of the sand—which may be either coarse or fine, sharp or smooth, depending upon the desired surface appearance—highly agitated by air pressure, as described, is to give the surface of the semi-plastic sheet, a mottled or variegated appearance, as diagrammatically shown in Figure 4.

In the accompanying drawings, the invention has been shown merely by way of example and in preferred form, but obviously many variations and modifications may be made therein which will still be comprised within its spirit. It is to be understood, therefore, that the invention is not limited to any specific form or embodiment, except insofar as such limitations are specified in the appended claims.

What I claim is:

1. In apparatus for subjecting the surface of plastic sheets to agitated sand, in combination, an upper enclosure having a roof and side and end walls, a lower enclosure having a floor and side and end walls, the side walls of the enclosures abutting in vertical alignment to form an airtight juncture and the end walls being spaced in vertical alignment to provide end clearances, an endless conveyor belt having an upper horizontally disposed loop passing through the said end clearances and adapted to carry a plastic sheet, a supply of sand in said upper enclosure above the upper belt loop, the said belt loop serving to retain the sand within the upper enclosure, means for admitting air pressure to the upper enclosure and directed downwardly towards the conveyor to agitate the sand, and means for admitting a heating fluid to the lower enclosure to maintain the said sheet in a semi-plastic state.

2. In apparatus for subjecting the surface of plastic sheets to agitated sand, in combination, a housing provided with aligned elongated slots, an endless conveyor belt having an upper horizontal loop passing through the said elongated slots to traverse the said housing and defining an upper compartment for the sand and a lower compartment, a supply of sand in said upper enclosure above the upper loop, means for agitating the sand in the upper compartment, and means for admitting a heating fluid to the lower compartment to mainatin plastic sheets carried on the said conveyor belt in a semi-plastic state.

3. In apparatus for subjecting the surface of plastic sheets to agitated sand, in combination, a housing, a horizontal conveyor for carrying plastic sheets through the said housing and adapted to support thereupon a supply of sand, means for directing compressed air towards the upper surface of the conveyor to agitate the sand, the said conveyor serving to retain the agitated sand within the housing, and means for heating the said plastic sheets to a semi-plastic state.

4. In apparatus for sand treating the surface of plastic sheets heated to a semi-plastic state, in combination, a housing, a horizontal conveyor passing through the said housing and defining an upper sand compartment and a lower heating compartment, means for agitating the sand in the said sand compartment, the said housing having parallel ledges upon which the marginal portions of the conveyor slides, the said conveyor and the said ledges blocking the passage of the agitated sand into the said heating compartment.

5. In apparatus for subjecting the surface of plastic sheets to agitated sand, in combination, a housing provided with a pair of elongated slots, a horizontal conveyor entering one of the said pair of slots and exiting from the other of the said pair of slots, for carrying plastic sheets through the said housing and supporting thereupon a supply of sand, pneumatic means for agitating sand, a strip of flexible material secured to the inside of the housing at the said entrance slot, and a strip of flexible material secured to the outside of the housing at the said exit slot, the distal edge of said strips bearing against the plastic sheets to prevent escape of the agitated sand at the respective slots.

6. In apparatus of the class described, in combination, a housing, a horizontal support for a plastic sheet in the said housing and defining a compartment, a supply of sand in the said compartment, fluid means for agitating the sand in the said compartment in contact with the surface of the said plastic sheet, and heating means for maintaining the said sheet in a semi-plastic state.

7. In apparatus of the class described, in combination, a housing, a support for a plastic sheet in the said housing, a layer of sand above the support and adapted to overlie the sheet, and a nozzled tube for conducting compressed air towards the support, to agitate the said sand and force free particles thereof against the surface of the said plastic sheet.

I. LAWRENCE LESAVOY.

REFERENCES CITED

The following references are of record in the file of this patent:

UNITED STATES PATENTS

| Number | Name | Date |
| --- | --- | --- |
| 644,282 | Crump | Feb. 27, 1900 |
| 835,541 | Leisegang | Nov. 13, 1906 |
| 870,156 | Bryson | Nov. 7, 1907 |
| 1,083,100 | Harlbut | Dec. 30, 1913 |
| 1,386,547 | Ziska | Aug. 2, 1921 |
| 1,556,261 | Stoddard | Oct. 6, 1925 |
| 2,098,748 | Jennings | Nov. 9, 1937 |
| 2,187,024 | Fowler | Jan. 16, 1940 |
| 2,218,227 | Winnek | Oct. 15, 1940 |
| 2,297,373 | Strange | Sept. 27, 1942 |
| 2,299,405 | Pranye | Oct. 20, 1942 |
| 2,358,710 | Helgeson | Sept. 19, 1944 |
| 2,388,880 | Stitt | Nov. 13, 1945 |
| 2,402,689 | Snow et al. | June 25, 1946 |